(12) United States Patent
Lee et al.

(10) Patent No.: US 9,867,332 B2
(45) Date of Patent: Jan. 16, 2018

(54) OPERATIONALLY TILTABLE COUNTER ROTATING TWIN BLADE MOWING DECK

(71) Applicants: Kai S. Lee, Portage, MI (US); Esther W. Lee, Portage, MI (US)

(72) Inventors: Kai S. Lee, Portage, MI (US); Esther W. Lee, Portage, MI (US)

(*) Notice: Subject to any disclaimer, the term of this patent is extended or adjusted under 35 U.S.C. 154(b) by 273 days.

(21) Appl. No.: 14/674,942

(22) Filed: Mar. 31, 2015

(65) Prior Publication Data

US 2015/0271994 A1 Oct. 1, 2015

Related U.S. Application Data (60) Provisional application No. 61/967,971, filed on Mar. 31, 2014, provisional application No. 61/997,271, filed on May 27, 2014.

(51) Int. Cl.
| | | |
|---|---|---|
| *A01D 34/73* | (2006.01) | |
| *A01D 34/71* | (2006.01) | |
| *A01D 34/66* | (2006.01) | |
| *A01D 34/76* | (2006.01) | |

(52) U.S. Cl.
CPC .......... *A01D 34/73* (2013.01); *A01D 34/662* (2013.01); *A01D 34/71* (2013.01); *A01D 34/76* (2013.01)

(58) Field of Classification Search
CPC .... A01D 34/00; A01D 34/001; A01D 34/015; A01D 34/662; A01D 34/667; A01D 34/71; A01D 34/73; A01D 34/76; A01D 34/84; A01D 34/86; A01D 2034/645; A01D 42/00; A01D 42/005; A01D 42/02; A01D 42/04; A01D 42/06; A01D 43/006; A01D 43/08; A01D 43/12; A01D 57/28; A01G 1/12

See application file for complete search history.

(56) References Cited

U.S. PATENT DOCUMENTS

| | | | |
|---|---|---|---|
| 2,863,162 | A | 12/1958 | Draughon |
| 2,889,641 | A | 6/1959 | Rechenberg |
| 2,984,919 | A | 5/1961 | Stoddard |
| 3,002,331 | A | 10/1961 | Denney |
| 3,064,369 | A | 11/1962 | Wildes |
| 3,142,913 | A | 8/1964 | Jacob |
| 3,208,167 | A | 9/1965 | Vincent |
| 3,286,376 | A | 11/1966 | Wildes |
| 3,316,696 | A | 5/1967 | Florido |
| 3,373,514 | A | 3/1968 | Forren |
| 3,382,615 | A | 5/1968 | Adell |
| 3,562,932 | A | 2/1971 | Rautio |

(Continued)

*Primary Examiner* — Alicia Torres
*Assistant Examiner* — Adam J Behrens
(74) *Attorney, Agent, or Firm* — Price Heneveld LLP (57) ABSTRACT

A mower deck is provided herein. The mower deck includes a housing having a top plate and a downwardly extending wall that depends from a substantial portion of a perimeter of the top plate. The housing includes an attachment member configured to hingedly couple the housing to equipment such that the housing may rotate through a plurality of positions. First and second blades are disposed within the housing configured to rotate in respective first and second directions. A driving unit is operatively connected to the first and second blades. A flexible transmission is coupled to the power source of the equipment and configured to power the drive unit, wherein the transmission is operable at each of the plurality of positions of the housing.

15 Claims, 12 Drawing Sheets

(56) References Cited

U.S. PATENT DOCUMENTS

| | | | |
|---|---|---|---|
| 3,673,776 A * | 7/1972 | Smith | A01D 42/08 37/243 |
| 3,690,047 A | 9/1972 | Thoen et al. | |
| 3,724,182 A | 4/1973 | Long et al. | |
| 3,774,321 A | 11/1973 | David | |
| 3,884,019 A * | 5/1975 | Gerzanich | A01D 34/86 56/12.7 |
| 4,037,390 A * | 7/1977 | Vogelenzang | A01D 34/86 198/300 |
| 4,064,079 A | 12/1977 | Sidebotham et al. | |
| 4,104,812 A | 8/1978 | Stribiak, Jr. | |
| 4,217,708 A | 8/1980 | Prenatt et al. | |
| 4,403,443 A | 9/1983 | Valente | |
| 4,446,679 A | 5/1984 | Thomas | |
| 4,487,003 A * | 12/1984 | Mathews | A01D 34/66 56/12.7 |
| 4,502,267 A * | 3/1985 | Klinner | A01D 34/66 56/13.6 |
| 4,532,725 A | 8/1985 | Trejo et al. | |
| 4,597,203 A | 7/1986 | Middleton | |
| 4,774,803 A | 10/1988 | Kempton | |
| 4,777,786 A * | 10/1988 | Arnold | A01D 34/49 56/16.6 |
| 4,833,800 A | 5/1989 | Ting | |
| 4,986,062 A * | 1/1991 | Hill | A01D 43/0633 56/16.9 |
| 4,986,063 A * | 1/1991 | Eggenmuller | A01D 43/0633 56/16.6 |
| 5,040,315 A | 8/1991 | Matson | |
| 5,052,135 A | 10/1991 | Fontaine | |
| 5,090,142 A | 2/1992 | Peters | |
| 5,101,911 A | 4/1992 | Lee et al. | |
| 5,163,276 A | 11/1992 | Mohrman | |
| 5,357,698 A | 10/1994 | Phillips | |
| 5,842,330 A * | 12/1998 | Richardson | A01D 34/667 56/13.6 |
| 6,026,635 A * | 2/2000 | Staiger | A01D 34/685 56/295 |
| 6,125,619 A * | 10/2000 | Wolff | A01D 34/662 56/14.9 |
| 6,840,027 B2* | 1/2005 | Donselaar | A01D 43/10 56/16.4 R |
| 6,865,868 B2 | 3/2005 | Moshi | |
| 6,926,091 B2 | 8/2005 | Lee | |
| 7,412,786 B1 | 8/2008 | Stewart | |
| 7,607,244 B2 | 10/2009 | Hishida | |
| 7,677,344 B2 | 3/2010 | Medina et al. | |
| 7,870,710 B2 * | 1/2011 | Koehn | A01D 34/662 56/15.9 |
| 2002/0083694 A1* | 7/2002 | Nagai | A01D 43/0635 56/16.8 |
| 2006/0218823 A1 | 10/2006 | Olmr et al. | |
| 2008/0289311 A1 | 11/2008 | Greene et al. | |
| 2012/0031064 A1* | 2/2012 | Barnett | A01D 34/668 56/157 |
| 2012/0279093 A1 | 11/2012 | Niemela et al. | |
| 2013/0125522 A1* | 5/2013 | Williams | A01D 34/822 56/16.9 |
| 2014/0102737 A1* | 4/2014 | Isbill | A01D 34/664 172/247 |
| 2014/0150391 A1* | 6/2014 | Enns | A01D 34/662 56/10.2 R |
| 2015/0096280 A1* | 4/2015 | Vondracek | A01D 34/664 56/255 |
| 2015/0107211 A1* | 4/2015 | Halter | A01B 63/10 56/14.9 |
| 2016/0029560 A1* | 2/2016 | Jespersen | A01D 34/668 56/189 |
| 2016/0157425 A1* | 6/2016 | Jespersen | A01D 34/661 56/6 |
| 2016/0198630 A1* | 7/2016 | Skoog | A01D 43/063 56/16.6 |

* cited by examiner

OPERATIONALLY TILTABLE COUNTER ROTATING TWIN BLADE MOWING DECK

CROSS-REFERENCE TO RELATED APPLICATIONS

The present application claims benefit of U.S. Provisional Patent Application No. 61/967,971, filed Mar. 31, 2014, and U.S. Provisional Application No. 61/997,271, filed May 27, 2014. The aforementioned related applications are hereby incorporated by reference as if fully set forth herein.

FIELD OF THE DISCLOSURE

The present disclosure generally relates to mower decks, and more particularly to mower decks employing the use of multiple blades.

BACKGROUND OF THE DISCLOSURE

Utilization of multiple blades in single mower housing offers various benefits, including the ability to mow a larger area simultaneously. It is therefore desired to implement such structures with multiple blades that may rotate in a plurality of directions.

SUMMARY OF THE DISCLOSURE

According to one aspect of the present invention, a mower deck is disclosed. The mower deck includes a housing having a top plate and a downwardly extending wall that depends from a substantial portion of a perimeter of the top plate. The housing has an attachment member configured to hingedly couple the housing to equipment having a power source such that the housing may rotate through a plurality of positions in relation to the equipment. A discharge chute is disposed through the downwardly extending wall. A first blade is disposed within the housing and is configured to rotate in a first direction. A second blade is adjacently disposed to the first blade within the housing and is configured to rotate in a second direction. A roller extends along an area proximate the rear surface of the housing. The roller is configured to move ground cover located rearward of the first and second blades laterally inward within the housing. A drive unit is operatively connected to the first and second blades for driving the first blade in the first direction and the second blade in the second direction. The drive unit has a flexible transmission coupled to the power source of the equipment and is configured to power the drive unit at each of the plurality of positions of the housing.

According to another aspect of the present invention, a mower is disclosed. The mower includes a power source and a housing having a top plate and a downwardly extending wall that depends from and substantial portion of a perimeter of the top plate. The housing has an attachment member configured to hingedly couple the housing to equipment such that the housing may rotate through a plurality of positions. A discharge chute is disposed in a front portion of the downwardly extending wall. A first shaft is mounted within the frame for rotation in a first direction. A second shaft is mounted within the frame for rotation in a second direction, which is opposite to the first direction, the second shaft being mounted in a substantially parallel plane with the first shaft. A driving unit is operatively connected to the first and second shafts for driving the first shaft in the first direction and the second shaft in the second direction. A roller extends along the rear surface of the housing. The roller is configured to move ground cover rearward of the first and second shafts laterally inward within the housing. A flexible transmission is coupled to the power source and configured to power the drive unit. The transmission is operable at each of the plurality of positions of the housing. An attachment feature is coupled to each shaft, the attachment feature configured to alter the ground disposed under the housing.

According to yet another aspect of the present invention, a mower is disclosed. The mower includes a power source. A housing has a top plate and a downwardly extending wall that depends from and substantial portion of a perimeter of the top plate. An attachment member is configured to hingedly couple the housing to equipment such that the housing may rotate through a plurality of positions in relation to a surface below the housing. First and second connection arms connecting respective first and second sides of the housing to first and second attachment points on the equipment. The attachment member and connection arms are configured to hold the housing in a fixed position above the ground. A discharge chute is disposed in a front portion of the downwardly extending wall. A first shaft is mounted within the frame for rotation in a first direction. A second shaft is mounted within the frame for rotation in a second direction, which is opposite to the first direction. The second shaft is mounted in a substantially parallel plane with the first shaft. First and second blades are coupled to the first and second shafts. A driving unit operatively connected to the first and second shafts for driving the first shaft in the first direction and the second shaft in the second direction. A first roller extending along the rear surface of the housing, the roller configured to move ground cover rearward of the first and second shafts laterally inward within the housing. A flexible transmission is coupled to the power source and configured to power the drive unit, wherein the transmission is operable at each of the plurality of positions of the housing.

These and other aspects, objects, and features of the present invention will be understood and appreciated by those skilled in the art upon studying the following specification, claims, and appended drawings.

DETAILED DESCRIPTION OF THE PREFERRED EMBODIMENTS

As required, detailed embodiments of the present invention are disclosed herein. However, it is to be understood that the disclosed embodiments are merely exemplary of the invention that may be embodied in various and alternative forms. The figures are not necessarily to a detailed design and some schematics may be exaggerated or minimized to show function overview. Therefore, specific structural and functional details disclosed herein are not to be interpreted as limiting, but merely as a representative basis for teaching one skilled in the art to variously employ the present invention.

As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

The following disclosure describes a mowing deck for attachment to outdoor equipment having a power source, such as a tractor, mower, blower, or any other outdoor powered equipment. The mower deck may advantageously employ first and second blades that rotate in opposing directions. The mower deck may further include a housing having a forward directed discharge chute through which the blades may discharge debris within the housing. It should be noted that debris might include any ground cover located beneath the housing.

Referring now to FIGS. 1-23, a mowing deck assembly 10 is provided which includes a mower deck housing 12 adapted for being suspended or otherwise attached to a front portion, rear portion, and/or beneath the frame of a tractor (not shown). The housing 12 includes a top wall 14 and side walls 16 depending therefrom. The mower deck 12 is generally enclosed; however, a discharge chute 18 is disposed in a sidewall 16 through which clippings are expelled. A pair of mower blades 20, 22 within the deck housing 12 may cut and discharge the clippings. The clippings are then deposited into the turf. First and second blades 20, 22 are utilized to maximize the re-cutting of clippings within the deck housing 12.

Figure 1:
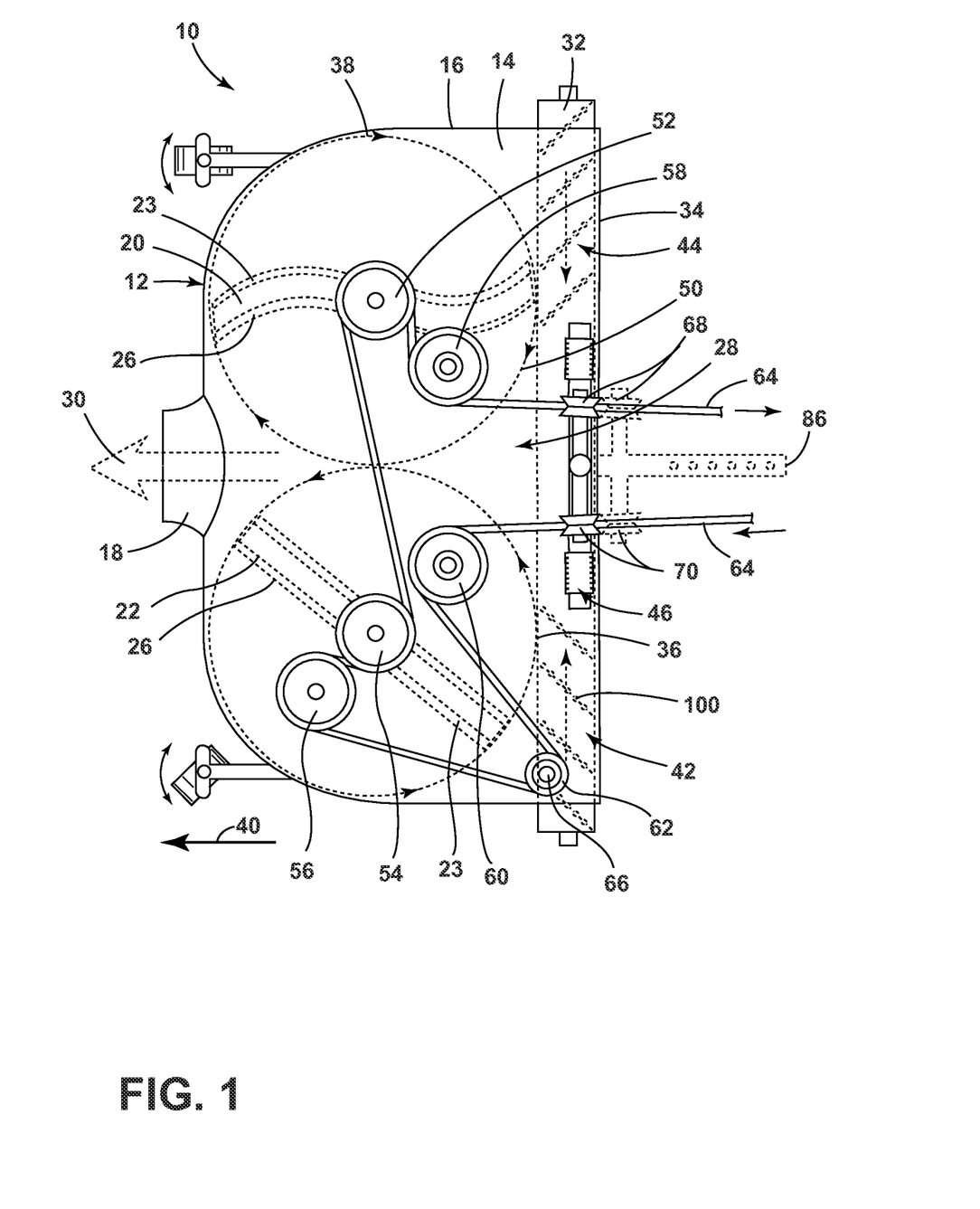
FIG. 1 is a top-down view of a mowing deck assembly, according to one embodiment.
Figure 7:
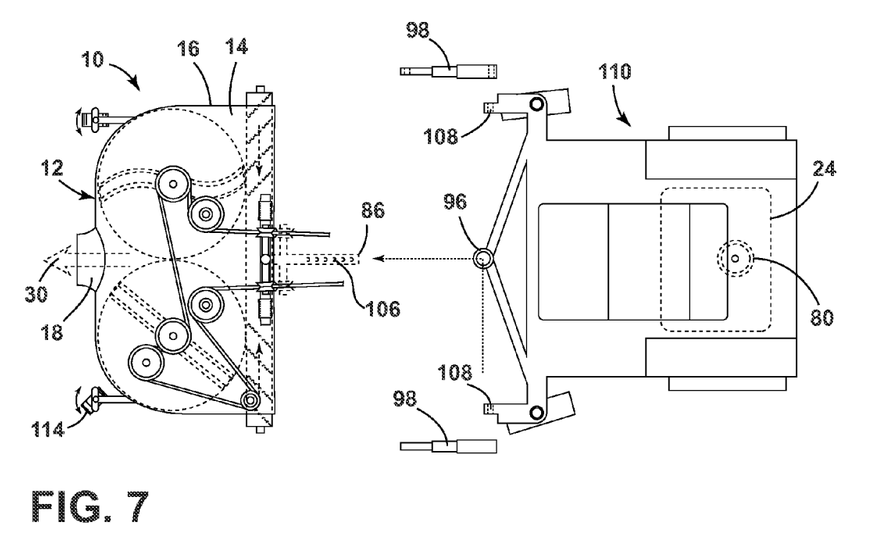
FIG. 7 is a top view of the mowing assembly components utilized for coupling the mowing deck assembly to a tractor.

Referring to FIG. 1, a multipurpose, rotating, twin blade lawn mowing deck assembly 10 according to one embodiment, is illustrated. The mowing deck assembly 10 may be installed on, and driven by, any lawn and garden equipment employing a power source 24 (FIG. 7). For example, the assembly 10 may be used for use in mowing the lawn, blowing snow, blowing leafs, chopping weeds and brush, and/or sweeping the ground/floor. The mower deck assembly 10 may be adapted for use on any of these purposes among other, in a few minutes, with minimal alterations or changing of parts.

The mowing deck assembly 10 includes a mowing deck housing 12 containing first and second rotating blades 20, 22. In the embodiment illustrated in FIG. 1, the mower deck housing 12 may include a top surface 14 that is generally horizontal. The top surface 14 of the mower deck housing 12 may be sheet metal or other rigid or semi-rigid material such as aluminum or plastic. Alternatively, the mower deck housing 12 (including the top surface 14) may be cast as a unit. Or the top of the mower deck housing 12 may be a single plate or a pair of plates, with the upper plate providing an outer or top surface and the lower plate providing an inner or bottom surface. At and around the rim or perimeter of top 14 may be downwardly depending sides 16. The sides 16 may extend down from the top several inches to form cutting chambers, and preferably may extend down to a level at or slightly below the horizontal plane of a first and second cutting blade disposed in the housing. The lower edges of the downwardly depending sides 16 may be provided with a flange or outwardly flared lip.

The mowing deck assembly 10 includes a mowing deck housing 12 that encloses the rotating first and second blades 20, 22. Inside the housing 12, the blades 20, 22 can each rotate freely at any speed. According to one embodiment, the first and second blades can rotate in opposing directions. The lead cutting edge 23 of the blades 20, 22 is sharp for efficient cutting. Opposite to the sharp edge is the trailing edge 26 of the blade that rises up to form a fan-like blade, designed for creating maximum lifting and blowing force as each blade 20, 22 spins. Furthermore, the blades 20, 22 may be S-shaped, like the first blade 20 in FIG. 1, to increase the blowing and lifting force provided through rotation of the blades 20, 22.

During operation, the first and second blades 20, 22 may spin at a high speed, thereby shearing the ground cover (e.g., grass) while lifting the clippings from the ground towards the ceiling 28 of the mower deck housing 12. The wind speed force 30 created by the fast rotation of the first and second blades 20, 22 may be the strongest near the ceiling 28 of the mower deck housing 12. This wind speed 30 force may discharge the grass clippings out of the mower deck housing 12 to a location substantially far from the mower deck housing 12 through a discharge chute 18. The chute 18 may direct the discharge in any desired direction. According to one embodiment, for lawn mowing, the preferred direction of the clippings may be to the front of the mower deck housing 12 so that the newly discharged grass clippings can be re-cut as the mowing deck assembly 10 advances over the clippings again, thereby mulching the clippings into smaller pieces. Through the rotation of the first blade 20 in a first direction, and the rotation of the second blade 22 in the second direction, a linear force 30 may be created between the first and second blades 20, 22 to push the clippings through the chute 18.

The mowing deck assembly 10 may further include a first roller 32, which may have a brush 100 disposed thereon. The first roller 32 may be housed inside the rear section 34 of the mowing deck housing 12. The first roller 32 is located proximately to the rear-spinning circumference 36 of the rotating blades 20, 22. The first roller 32 may extend the entire rear 34 underside length of the mowing deck housing 12 thereby covering the lateral spinning circumference 38 of both blades 20, 22. Further, the first roller 32 is rotatably fixed such that the central axis thereof is perpendicular to the travel direction 40 of the mowing deck assembly 10.

The first roller 32 may include a first half 42 having helical threads thereon configured in a first direction and a second half 44 having helical threads disposed thereon in a second direction. The first and second helical threads may have a mirrored directional relationship and may be configured to move clippings towards a central portion of the mower deck housing 12. As the first roller 32 rotates, the threads, which may create an auger like surface, on the roller 32 will move clippings towards the roller's 32 mid-section. Thus, any debris caught between the blades 20, 22 is channeled to the mid-section and then blown forward by the rotating first and second blades 20, 22. The first roller 32 is driven to rotate by a pulley 62, through the use of a worm gear coupling 66. According to one embodiment, the first roller 32 rotates clockwise or towards the advancing direction 40 of the mowing deck assembly 10.

During lawn mowing, the grass clippings trapped inside the mowing deck housing 12 may be forced upwardly by the rotating blades 20, 22 and channeled to the midsection of the mowing deck housing ceiling 28. The clippings are then blown out 30 through the chute 18. However, some grass clippings will be discharged rearward 36, towards the first roller 32. These rearward stray grass clippings will be swept up by the forward, rotating first roller 32 and then pushed back towards the spinning blades 20, 22. The blades 20, 22 may then discharge the stray grass clippings out through the chute 18. In this way, the first roller 32 acts as a sweeper behind the fast spinning blades 20, 22.

The mowing deck assembly 10 may also include an attachment assembly, such as a pivotal steel rod hinge assembly 46 that may be utilized for connecting the mower deck assembly 10 to outdoor equipment 110 (FIG. 7) that contains the power source (engine), as well as additional features such as wheels, driving means and steering module of the outdoor equipment.

The first and second blades 20, 22 are coupled to a drive unit that is configured to rotate each blade. According to one embodiment, a plurality of pulleys 52, 54, 56, 58 60, and 62 and a transmission, such as continuous drive belt 64, rotate each component within the assembly 10. In such a configuration, a first pulley 54 drives the first blade 22 while a second pulley 52 drives the second blade 20.

The pulleys 52, 54, 56, 58 60, and 62 may be configured such that the first blade 20 is rotated in a first direction while the second blade 22 rotates in the opposing direction. Additional pulleys 56, 58 and 60 may be idler pulleys that direct the travel direction of the drive belt 64. A roller pulley 62 may be utilized for driving the first roller 32 through a worm gear coupling 66. As the engine runs, the drive belt 64 circles through the drive unit. In response, the blades 20, 22 will counter rotate 50, resulting in efficient grass shearing and blowing through the chute 18 to the outside of the mowing deck housing 12.

The belt 64 is configured to be flexible such that the transmission system is operable while the mower deck assembly 10 is tilted, or rotated in an upwardly position. Such bending of the belt 64 does not diminish power transmission nor interfere with the spinning speed of the counter rotating 50 blades 20, 22. The bending of belt 64 may be made possible by placing the belt 64 under idler pulleys 68, 70, one on the right 68, on the outgoing belt 64, and one on the left 70, on the incoming belt 64. The idler pulleys 68, 70 may hold the belt 64 in place while it is travelling, even at high speeds. Therefore, the first and second blades 20, 22 can spin freely at high speed regardless of the positioning angle of the mowing deck assembly 10. Thus the mower deck assembly 10 may be operable while positioned horizontally, vertically, laterally, to the right, to the left, and/or any combination thereof.

As the rotating blades 20, 22 spin in a plurality of positioning angles, the mowing deck assembly 10 may perform multiple tasks. For example, horizontal positioning of the deck assembly 10 and the blades 20, 22 may be utilized for lawn mowing, mulching, blowing leafs, and/or ground sweeping. On the other hand, erecting, or rotating, the mowing deck assembly 10 allows the rotating blades 20, 22 to blow snow, blow leafs, or cut weeds and brush. The user can raise or lower the mowing deck assembly 10 in a few minutes to perform any of these tasks.

It is contemplated that alternate drive unit systems known in the art may be utilized instead of, or in combination with, the bendable belt 64 and pulley 52, 54, 56, 58, 60, and 62 system. For example, a gear driven system using universal joints 72 (FIG. 5) may be used. Alternatively, a hydraulic drive system that can be bent to any angle without affecting high-speed rotation of the blades 20, 22 may also be used.

Figure 2:
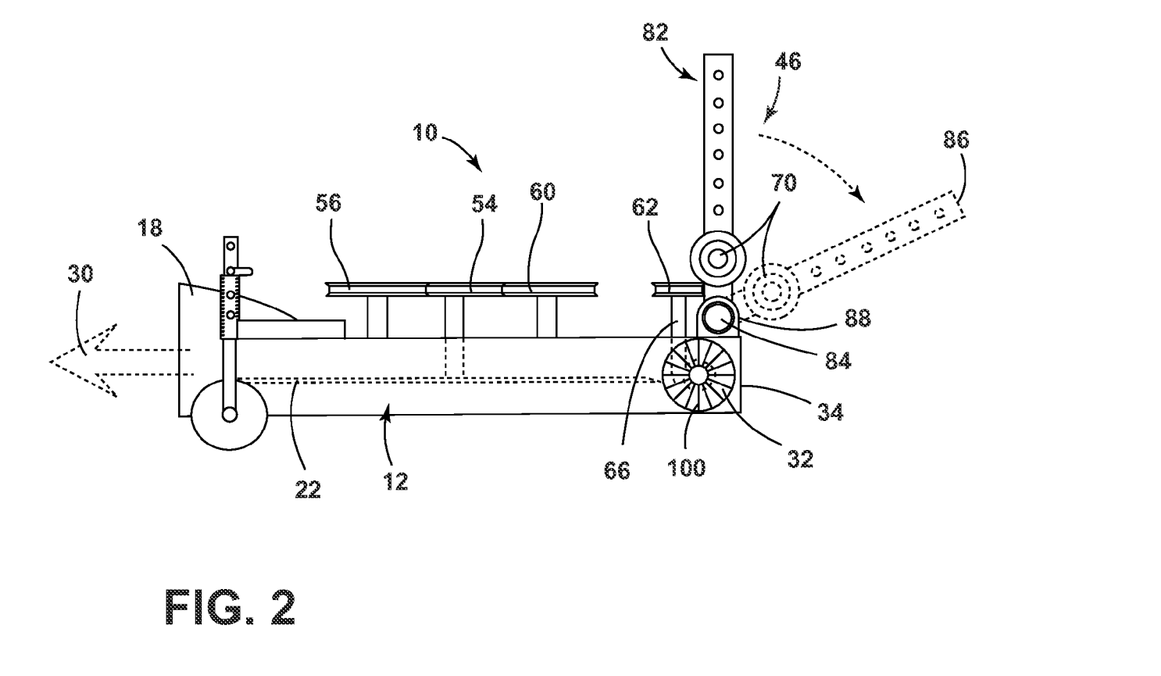
FIG. 2 is a side perspective view of the mowing deck assembly.
Figure 3:
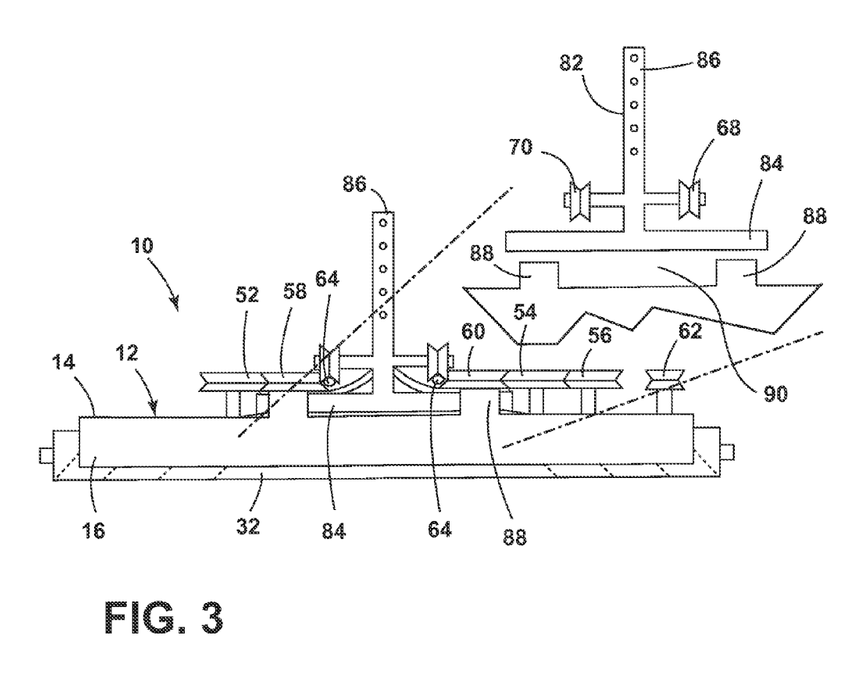
FIG. 3 is a rear end view of the mowing deck assembly.
Figure 4:
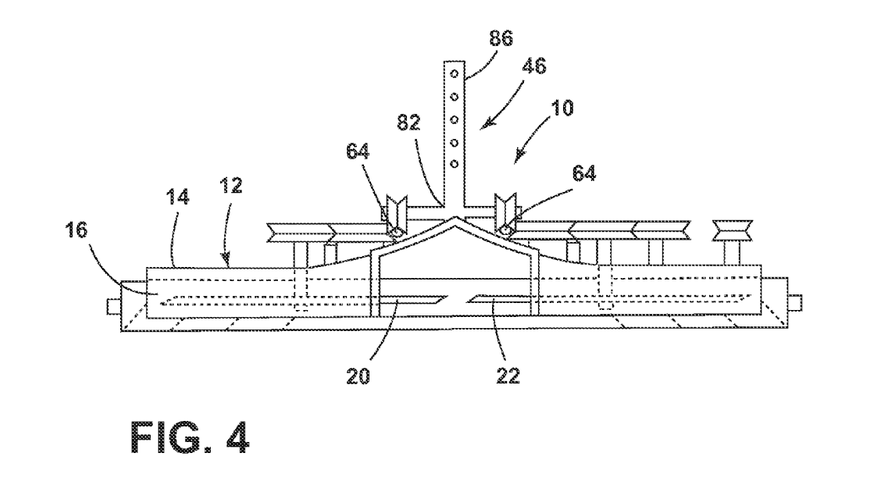
FIG. 4 is a front view of the mowing deck assembly having first and second blades disposed within the housing.
Figure 5:
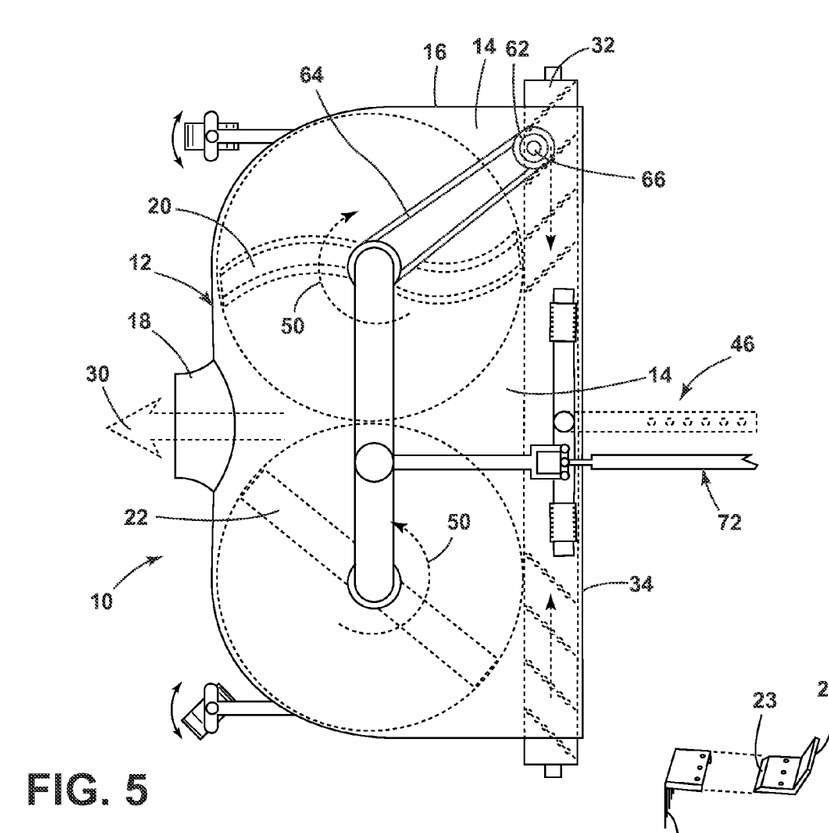
FIG. 5 is top down view of a mowing deck assembly, according to another embodiment, having a flexible hydraulic transmission with universal joints therein.

Referring to FIGS. 2-4, a member is disposed on an upper, reward portion of the housing 12 that is configured to attach the mowing deck housing 12 to a mower. For example, a steel rod-hinge assembly 46 may be used to provide the pivotal joining of the assembly 10 to the mower body 110, which may be a zero-turn lawn mower body. After the mowing deck assembly 10 is properly joined to the mower body through the steel rod hinge assembly 46, and the drive belt 64 is connected to the engine drive pulley 80 (FIG. 8), the blades 20, 22 may be driven to rotate 50. Furthermore, after joining to the mower body 110, the front of the mowing deck assembly 10 can be raised or lowered, or turned right or left, without hindering the spinning speed of the rotating blades 20, 22.

The steel rod hinge assembly 46 illustrated in FIGS. 2-4 includes a first member 82 that is shaped as an inverse T steel rod. The inverted T has a horizontal rod 84 and a center rod 86. A second corresponding member consists of steel tubing 88 that allows the smaller horizontal rod 84 to fit there through. The tubing 88 is welded longitudinally on the rear mid-section of the mower deck housing 12. A space 90 separates the tubing 88. For proper assembling, each end of the horizontal rod 84 is inserted through the respective tubing 88 such that the center rod 86, which is then aligned with the mid section of the mower deck housing 12, can swing vertically forward or rearward. If the position of the center rod 86 is fixed, the horizontal rod 84 inside the tubing 88 can work as a hinge to allow the front of the mowing deck assembly 10 to be raised or lowered.

FIGS. 5-9 illustrate a modified zero-turn lawn mower 110 that may be coupled with the mowing deck assembly 10. The multi-purpose mowing deck assembly 10 may be installed on and driven by any mobile power source, such as a lawn mower, for example, a zero-turn lawn mower, a walk-behind lawn mower, and/or riding lawn/garden tractor. Also, the mowing deck assembly 10 can be installed onto and driven by any large commercial tractors if it 10 is scaled up to the appropriate size. In order to couple the mowing deck assembly 10 to the front of the lawn mower a round, vertical joining tube 96 on a front portion of the mower may be used. The internal diameter of the tube 96 is configured to removably couple with the center rod 86 of the inverted T 82. Additionally, each side of the mowing deck housing 12 may include a retractable support arm 98 that can be mechanically or hydraulically driven to linearly extend or contract.

Figure 6:
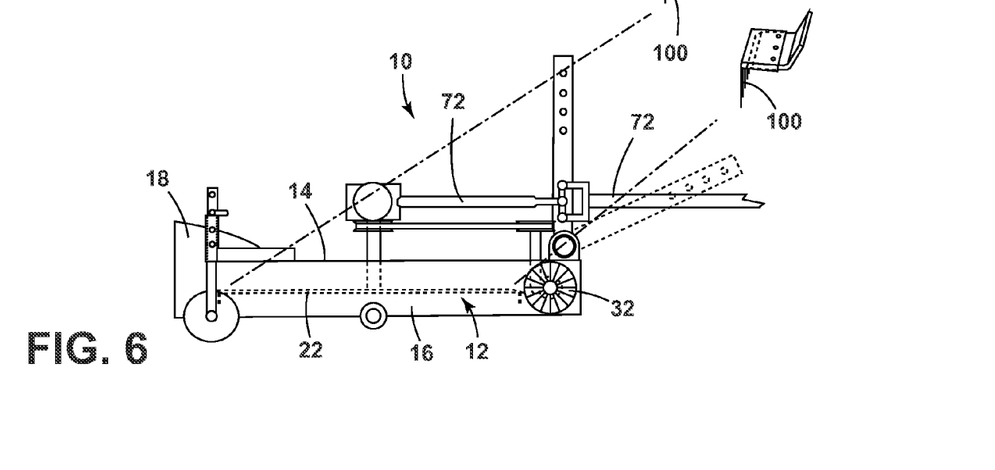
FIG. 6 is a side view of the mowing assembly having brushes disposed on the blades.

Referring to FIG. 6, the flat-on-the-ground positioning of the mowing deck assembly 10 may also sweep the ground or floor. To do this, a brush 100 is attached to each rotating blade 20, 22. The spinning blades 20, 22 of the mowing deck assembly 10 will sweep the floor and blow the dirt forward. The first roller 32 may help to sweep up the debris or dust left behind by the brushes 100 on the blades 20, 22, resulting in a cleaner ground as the mower advances.

The vertical distance of the first roller 32 relative to the ground can be adjusted by sliding the center rod 86 inside the vertical joining tube 96 up or down. Once the desired height is obtained, the distance is fixed by inserting the stop pin 104 through an appropriate hole 106 in the center rod 86.

Figure 8:
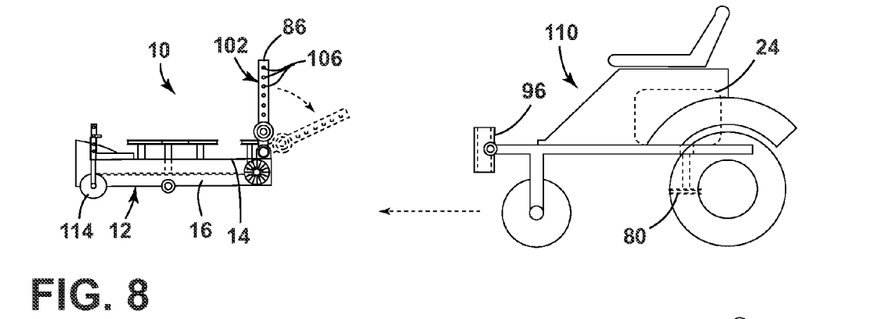
FIG. 8 is a side view illustrating the mowing deck assembly coupling to a tractor.
Figure 9:
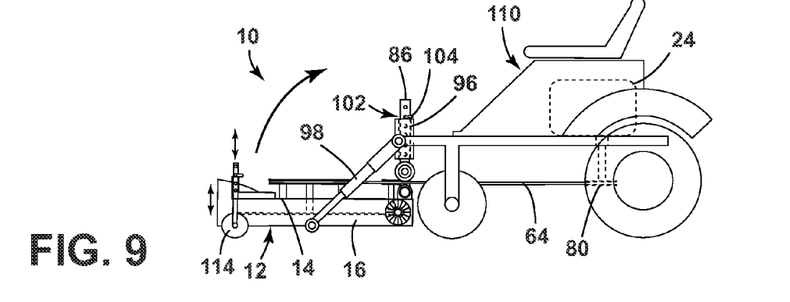
FIG. 9 is a side view of the mowing deck assembly coupled to the front portion of a tractor.

According to the embodiment illustrated in FIGS. 7-9, the mowing deck assembly 10 is attached to a mower 110 through insertion of the smaller, round, center rod 86 into the larger, round, vertical joining tube 96. A height adjustment mechanism 102 may include stop pin 104 that is inserted into a height adjusting hole 106 above the vertical joining tube 96 to set the rear end 34 height of the mowing deck housing 12 above the ground. Each support arm 98 is then attached to each side 108 of the mowing deck housing 12 and to an attachment point proximate the front 108 of the lawn mower 110. Lastly, the drive unit is connected to the mower deck housing 12 and the power source drive belt 64 is placed around each pulley and around the engine pulley 112.

Once installed, the support lever 98 is extended downward to place a pair of swirl wheels 114 on the ground making the mowing deck assembly 10 and blades 20, 22 substantially parallel to the ground. With the swirl wheels 114 placed on the ground, the rear end 34 of the mowing deck assembly 10 may be suspended above the ground by the height chosen through the height adjustment mechanism 102. In such configuration, the mating of the rod 84 with the tube 88 allows the front of the mowing deck assembly 10 to be raised, lowered, and/or rotated to any angle. Further, the mating of the rod 86 with the tube 96 also may allow the mowing deck assembly 10 to turn right or left.

The mowing deck assembly 10 may be positioned parallel to the ground while securely connected to the power source 24 to work as a uniquely powerful lawn mower. The rotating blades 20, 22 will cut grass, and blow 30 the clipping forward through the chute 18. Simultaneously, the roller 32 may sweep up the clippings left behind by the blades 20, 22, resulting in a clean, and cut lawn as the mower 110 advances. In addition, the rotating blades 20, 22 in the mowing deck assembly 10 may chop, shred, sweep, and/or blow leafs while positioned in a substantially parallel position to the ground. The first roller 32 may help to sweep up the leaves and debris left behind by the blades 20, 22, resulting in a cleaner lawn as the mower assembly 10, 110.

Figure 10:
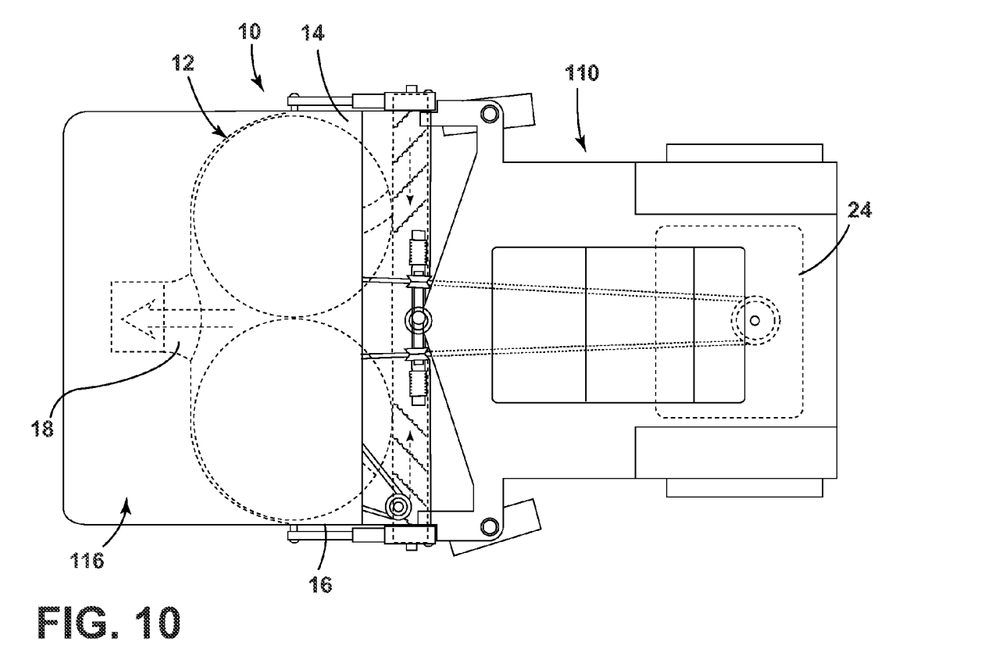
FIG. 10 illustrates an exemplary top view of the mowing deck having a debris collection bag disposed thereon coupled to a tractor.
Figure 11:
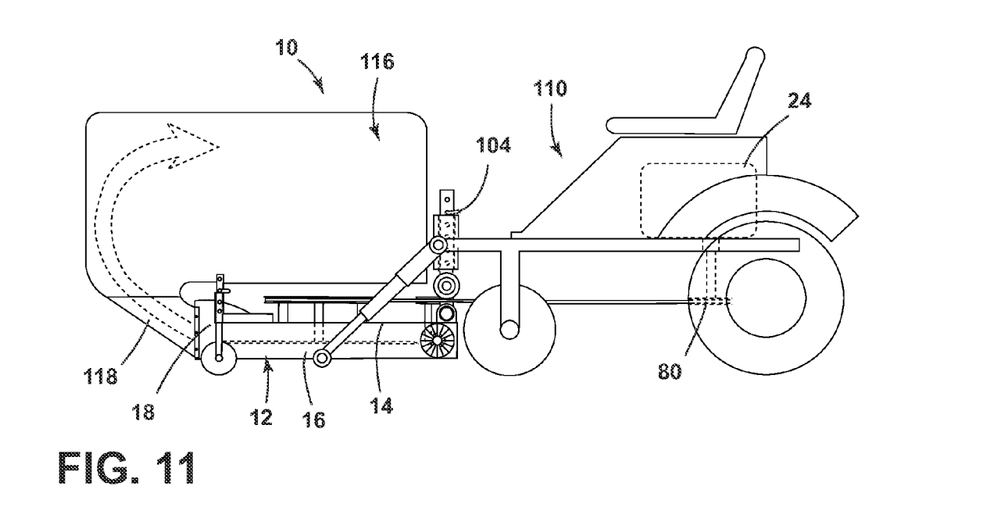
FIG. 11 is a side view of the mowing deck having a debris collection bag disposed thereon and an extension member connecting the discharge chute to the debris collection bag.

Referring to FIGS. 10-11, a debris collection bag 116 may be placed on and/or attached to the top of the mowing deck assembly 10. After the collection bag 116 is connected to the chute 18 of the mowing deck assembly 10, debris will be blown into the collection bag 116 by the force of the rotating blades 20, 22.

As illustrated in FIG. 11, an extension member 118 may be attached to the chute 18. The debris collection bag 116 may then attach to the extension member 118. Alternatively, the extension member 118 may be used by itself to further direct debris in any desired direction.

Figure 12:
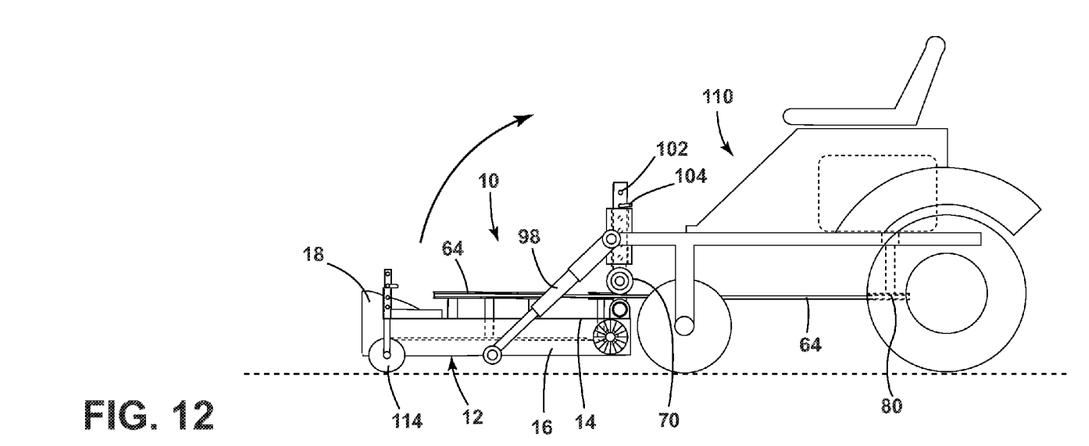
FIG. 12 is an exemplary side view of the mowing deck coupled to the front of a tractor with the mowing deck in a position parallel to the ground.
Figure 13:
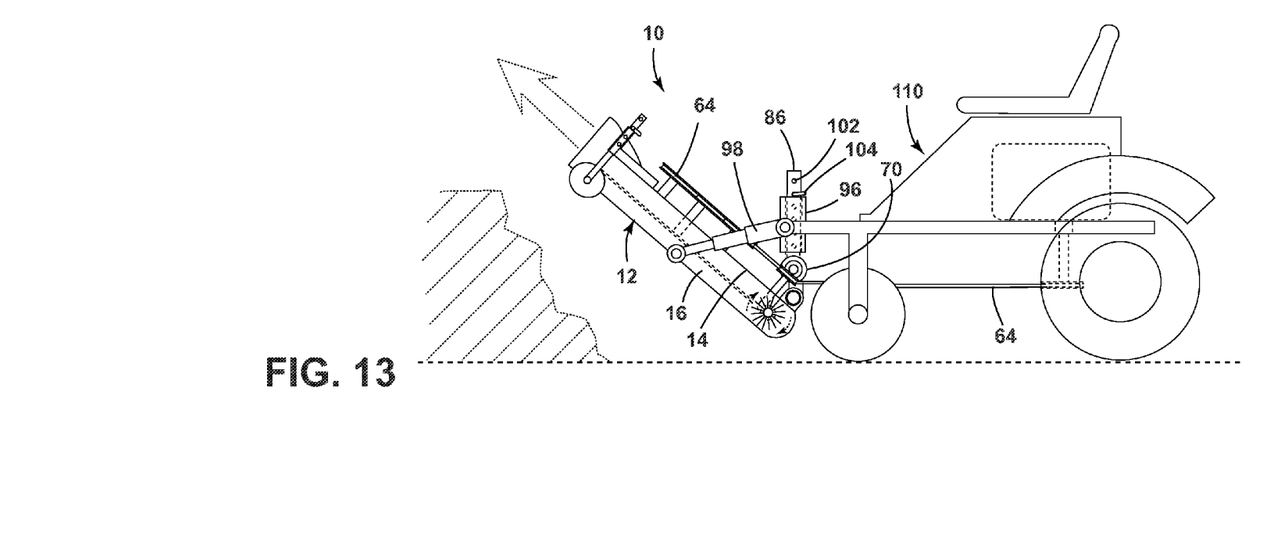
FIG. 13 is a side view of the mowing deck assembly suspended above the ground and rotated about an axis proximate the rear portion of the housing.

Referring to FIGS. 12-13, the front of mowing deck assembly 10 may be tilted, raised, and/or erected by shortening the retractable support arms 98. The front of the mowing deck assembly 10 will be raised to fully expose the rotating blades 20, 22 underneath, inside the mowing deck housing 12. With the mowing deck housing 12 in a rotated position, as illustrated in FIG. 13, the assembly 10 may function as a snow blower. As the assembly 10 is moved towards snow, the spinning blades 20, 22 will make contact with the snow, thereby throwing the snow up and away to the front. If it is desired to have the snow discharged sideways, the erected mowing deck assembly 10 may be turned to one side by shortening the retractable arm 98 on that side, and vice versa. Additionally, the chute 18 may be lengthened and/or bent to further direct the snow flow. The first roller 32 may help to sweep up the snow left behind by the snow blowing blades 20, 22, as described earlier.

The erected mowing deck assembly 10 may also be used for cutting or chopping tall weeds and brush. The erected mowing deck assembly 10 may advance towards the weed and brush, causing the blades 20, 22 to cut and shred the vegetation in front. The advantage of the erected deck assembly 10 for cutting brushes is that the blades 20, 22 will not be jammed by thick weed/brush because there is increased open space between the vegetation and the blades 20, 22. It is further contemplated that a safety shield may hang from a front portion of the housing 12 when the housing 12 is in a rotated position.

Figure 14:
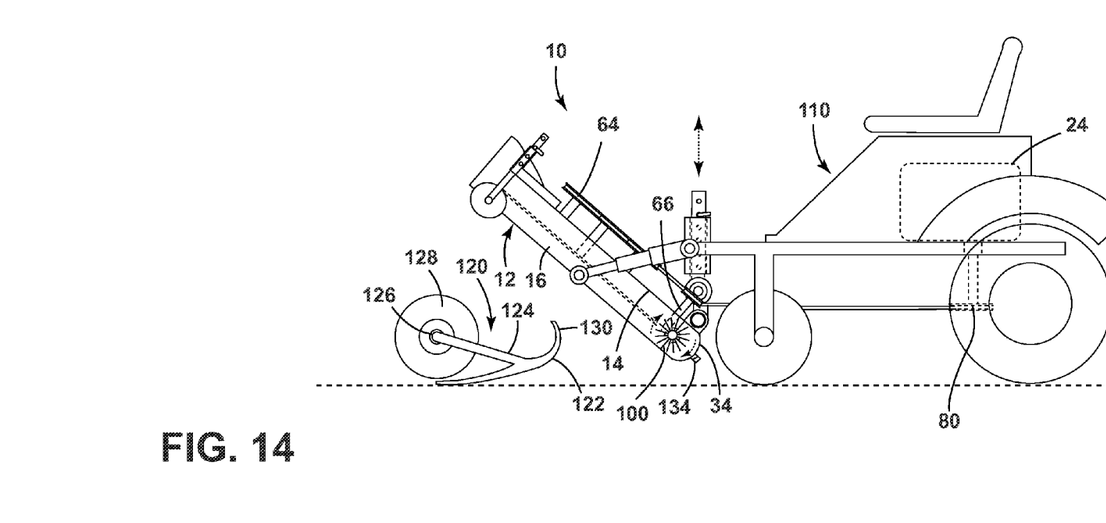
FIG. 14 is a side view of the mowing deck assembly, according to an alternative embodiment, having a shovel assembly coupled thereto.
Figure 15:
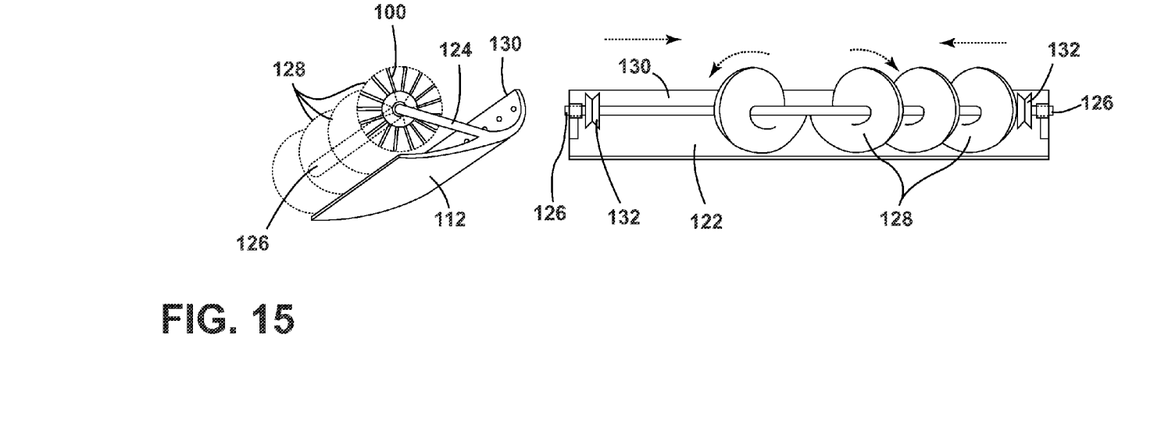
FIG. 15 illustrates the shovel assembly having a helical surface disposed thereon.
Figure 16:
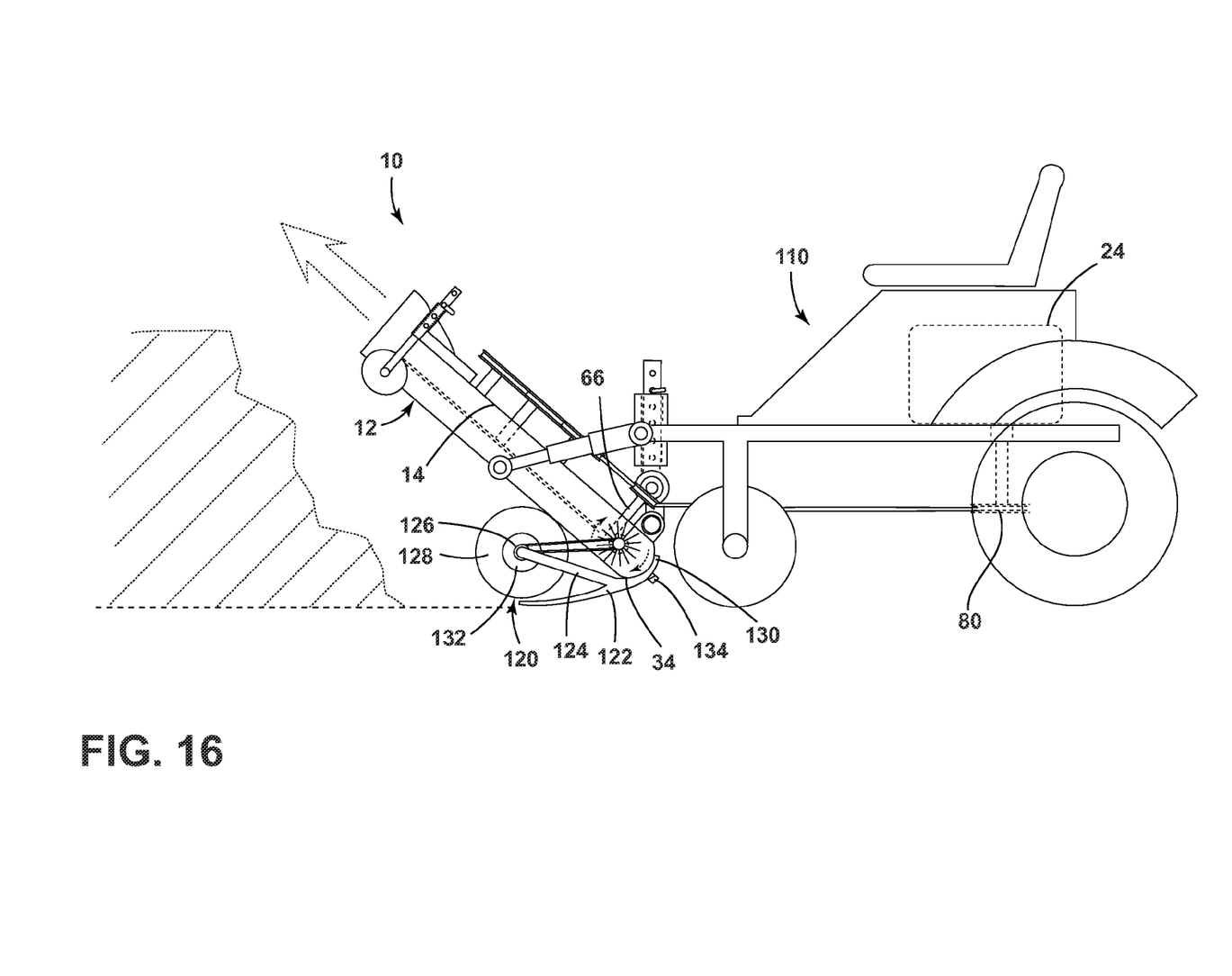
FIG. 16 is a side view of the mowing deck assembly having the shovel assembly coupled thereto suspended from a front portion of the tractor at an angle.

Referring to FIGS. 14-16, the mowing deck assembly 10 can be converted to a 2-stage snow blower including a shovel assembly 120 having a second roller assembly 128. The shovel assembly 120 includes a frame 122 having a bottom, planar portion 112. On either side of the frame 122, an arm support 124 rotatably supports one end 126 of the second roller 128. The back 130 of the frame 122 may be removably coupled to the back wall 34 of the mowing deck housing 12. The second roller 128 may be rotated by the first roller 32 through a belt-pulley system 132, or by the use of another gear mechanism. Alternatively, the second roller assembly 120 may be driven to rotate directly by the worm gear coupling 66.

According to one embodiment, the second roller 128 is installed and used when the mowing deck assembly 10 is erected to any angle between 0 and 100 degrees. The second roller assembly 120 can be easily attached to or detached from the mowing deck assembly 10, which may be done by tightening or removing the bolts 134 that secure the back 130 of the frame 122 to the back 34 of the mowing deck housing 12. It is contemplated, however, that the second roller assembly 120 may be attached through any means known in the art, including, but not limited to, any type of mechanical fasteners.

During operation, as the blades 20, 22 spin, both the first 32 and second 120 rollers will rotate in the same direction, or an opposite direction, depending on the preferred usage of the assembly 10. For example, if the first and second rollers 32, 120 rotate clockwise, the machine 10, 110 will direct the snow forward, and up to the blades 20, 22. The rotating blades 20, 22 will then blow the snow forward and through the chute 18. Therefore, the second roller system 120 may act as a first stage, and the rotating blades 20, 22 may act as a second stage of the snow blower. The first roller 32 may or may not be utilized depending on the circumstance.

Referring to FIGS. 17-23, a mowing deck assembly 10 that carries an engine 136 on a top portion thereof is illustrated. The engine 136 will directly drive the rotating blades 20, 22 to spin, in opposing directions, thereby mowing the grass, and blowing the grass clippings forward 30.

Figure 17:
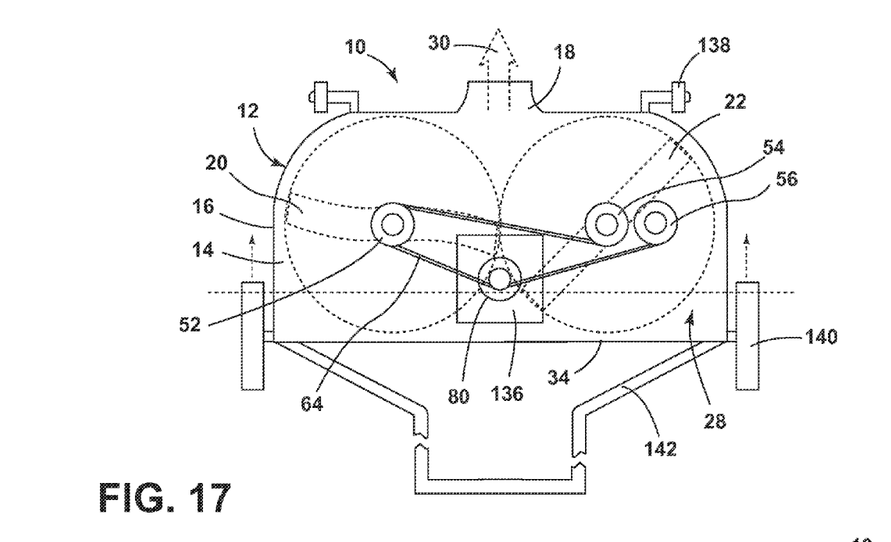
FIG. 17 is a top view of the mowing deck assembly having a power source disposed on top of the mowing deck assembly.
Figure 18:
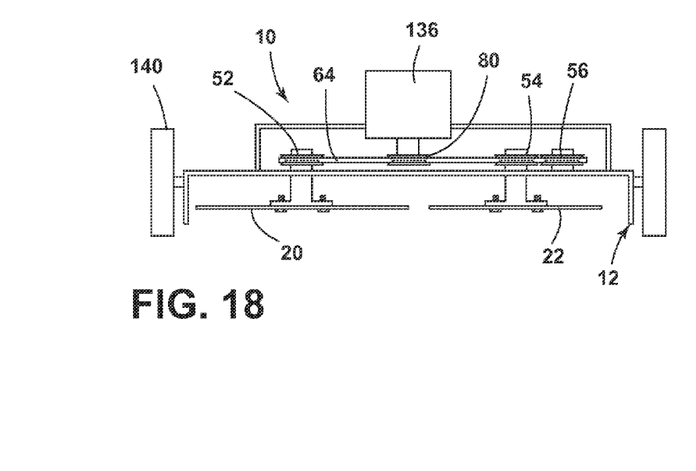
FIG. 18 is a cross-sectional view of the mowing deck assembly having a power source disposed thereon.
Figure 19:
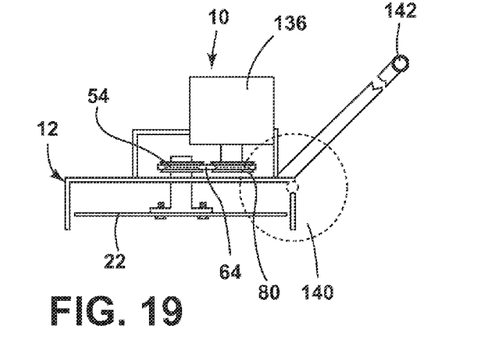
FIG. 19 is a cross-sectional side view of the mowing deck assembly having the power source disposed thereon.
Figure 20:
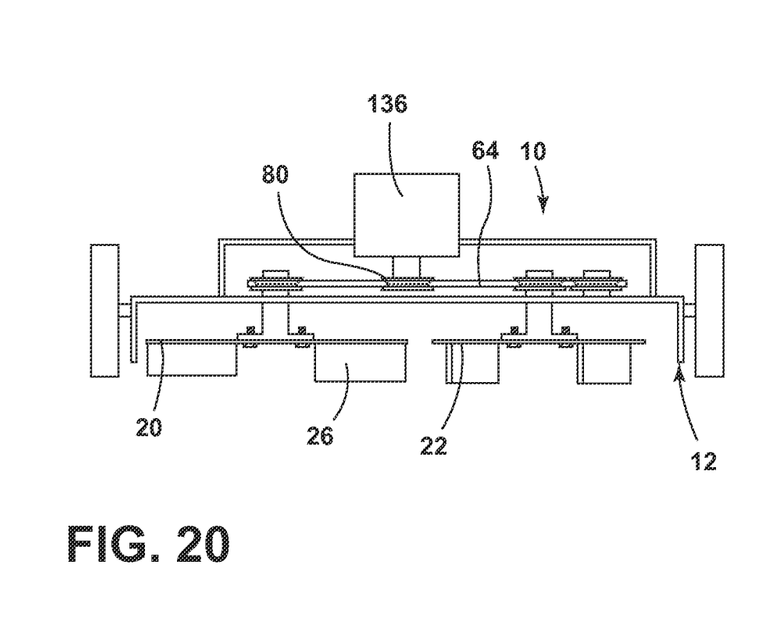
FIG. 20 is a front cross-sectional view of the mowing assembly having first and second blades with vertical trailing surfaces.

The mowing deck assembly 10 rests on four wheels, one on each side at front 138, and rear 140. Further, a guide handle 142 that can vertically swing up or down to a locked position is attached to the mowing deck assembly 10. In this configuration, the mowing deck assembly 10 has its own power source 136 and guide handle 142 that allows it 10 to be pushed from behind for mowing. The brush 100 on the first roller 32 may be disposed rearward the blades 20, 22 to help sweep debris forward in the same manner described above.

Figure 21:
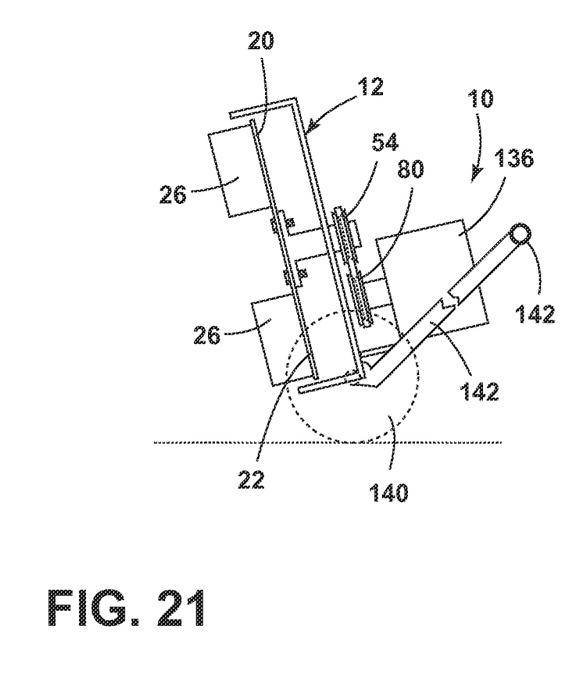
FIG. 21 illustrates the mowing assembly having a power source disposed thereon rotated at an angle.

The front of the mowing deck assembly 10 may be erected or tilted up (FIG. 21). According to the illustrated embodiment, pushing the guide handle 142 downwardly thereby using the wheels 140 as the pivot point may do the tilting. The mowing deck assembly 10 may be rotated to any angle between 0 and 90 degrees. The mowing deck assembly 10 may be locked at any desired angle. Additionally, self-propelled wheels may be used.

Both the larger mowing deck assembly 10 and the smaller, self-contained machine (FIGS. 17-21) will be able to perform exact same functions when its mowing deck assemblies 10 are positioned at the same angle. Thus, the mowing deck assembly 10 described herein may accomplish a plurality of tasks including, but not limited to, mowing, sweeping, leaf blowing, snow blowing and brush/weed cutting.

Figure 22:
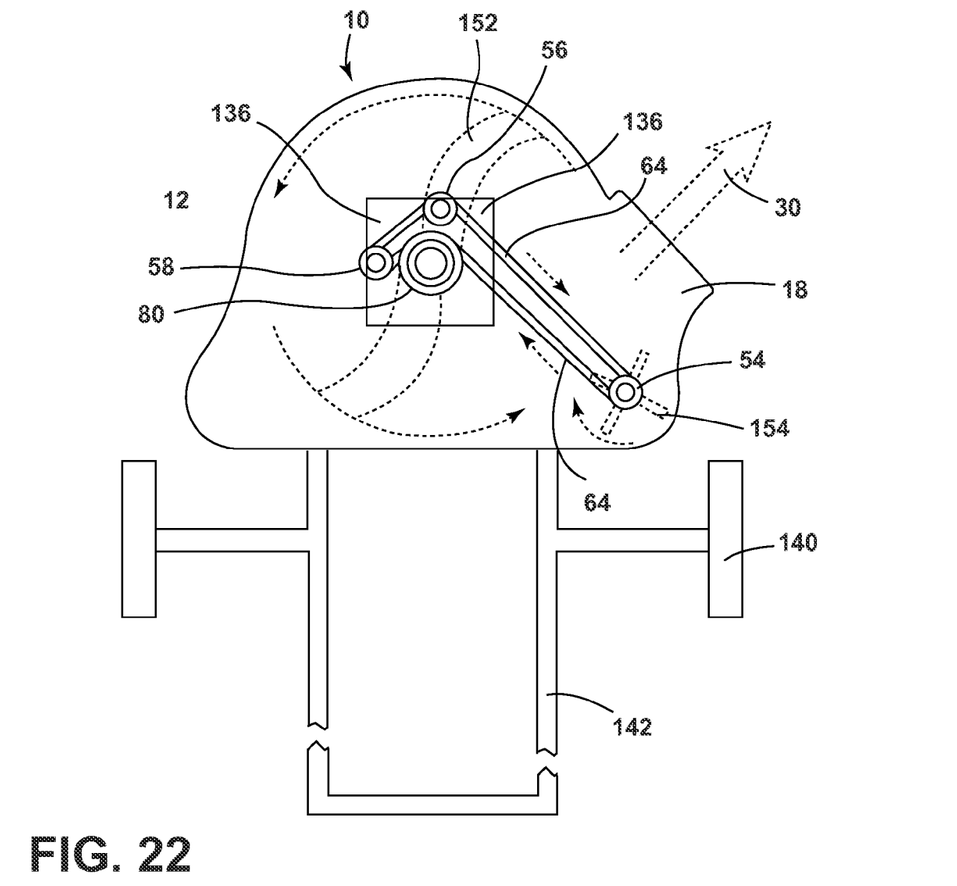
FIG. 22 is a top view of the mowing deck assembly, according to an alternate embodiment, having a large first blade and a smaller second blade.
Figure 23:
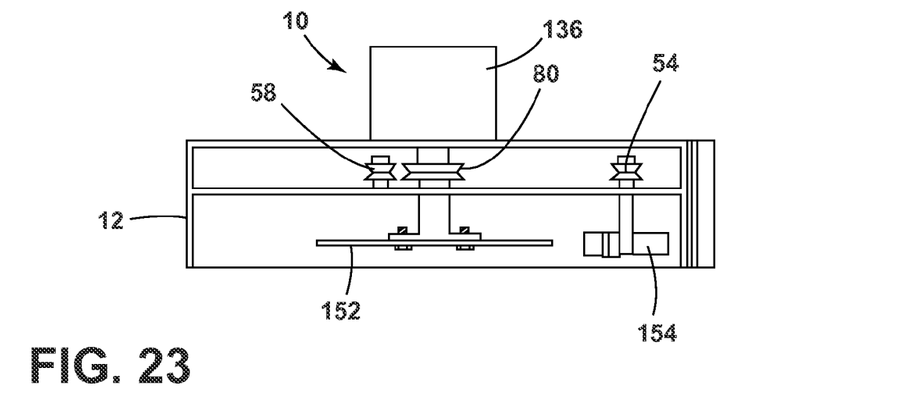
FIG. 23 is a cross-sectional view of the mower deck assembly of FIG. 22.

Referring to FIGS. 22-23, a conventional single blade 152 lawn mower may further include a second blade 154 that can be attached or built-in the lawn mower. As illustrated, the drive belt 64 is re-routed around additional pulleys 80, 54, 56, 58 to drive the twin blades 152, 54 to counter rotate. The add-on blade 54 can be smaller, equal, or larger than its counterpart 152. Once a second, counter rotating blade 54 is attached, the lawn mower may do similar jobs to those described above.

Accordingly, a mower deck having first and second blades rotating in respective first and second directions has been advantageously described herein. The mower deck provides various benefits including, but not limited to, an efficient assembly that may be used for a plurality of tasks with minimal adjustment.

It is also important to note that the construction and arrangement of the elements of the disclosure as shown in the exemplary embodiments are illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown in multiple parts may be integrally formed, the operation of the interfaces may be reversed or otherwise varied, the length or width of the structures and/or members or connectors or other elements of the system may be varied, the nature or number of adjustment positions provided between the elements may be varied. It should be noted that the elements and/or assemblies of the system might be constructed from any of the wide variety of materials that provide sufficient strength or durability, in any of the wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will also be understood that any described processes or steps within described processes may be combined with other disclosed processes or steps to form structures within the scope of the present disclosure. The exemplary structures and processes disclosed herein are for illustrative purposes and are not to be construed as limiting.

What is claimed is:

1. A mower deck, comprising:
   a housing having a top plate and a downwardly extending wall that depends from a substantial portion of a perimeter of the top plate, the housing having an attachment member configured to hingedly couple the housing to equipment having a power source such that the housing may rotate through a plurality of positions in relation to the equipment, wherein the plurality of positions place the housing in a rotated position at an angle that is non-parallel to a surface below the housing;
   a discharge chute disposed through the downwardly extending wall;
   a first blade disposed within the housing configured to rotate in a first direction;
   a second blade adjacently disposed from the first blade within the housing configured to rotate in a second direction;
   a roller extending proximate the rear surface of the housing, the roller configured to move ground cover located rearward of the first and second blades laterally inward within the housing; and
   a drive unit operatively connected to the first and second blades for driving the first blade in the first direction and the second blade in the second direction, wherein the drive unit has a flexible transmission coupled to the power source of the equipment and configured to power the drive unit at each of the plurality of positions of the housing.

2. The mower deck of claim 1, wherein the first blade rotates in a clockwise direction and the second blade rotates in a counter-clockwise direction.

3. The mower deck of claim 1, wherein each blade includes mulching blades which include forward cutting portion and a trailing upturned surface configured to generate wind force within the housing.

4. The mower deck of claim 1, further comprising:
   a fan blade disposed above the first or second blade configured to increase the wind force within the housing.

5. The mower deck of claim 1, further comprising:
a first auger blade helically wrapped around a first portion of the roller; and
a second augur blade helically wrapped around a second portion of the roller, wherein the second auger blade is disposed in a mirrored orientation to the first auger blade.

6. The mower deck of claim 1, wherein the transmission is a belt having a circular cross-section.

7. The mower deck of claim 1, wherein the transmission is hydraulically operated.

8. The mower deck of claim 1, wherein the attachment member further comprises:
a first hinge configured to adjust the vertical and horizontal positioning of the housing, wherein the first hinge is provided by a horizontal rod of the attachment member coupling to tubing on the housing; and
a second hinge configured to join the mowing deck to the equipment, the second hinge further providing lateral adjustment of the housing, wherein the second hinge is provided by a center rod of the attachment member coupling to a vertical joining tube, and wherein the lateral adjustment of the housing is accomplished by actuating at least one retractable support arm.

9. The mower deck of claim 1, further comprising:
a first connection arm removably coupled to a first side of the housing and a first side of the equipment; and
a second connection arm removably coupled to a second, opposing side of the housing and a second, opposing side of the equipment.

10. The mower deck of claim 1, wherein the first and second blades rotate when the angle of the housing is fixed between about 10° and about 90°.

11. A mower comprising:
a power source;
a housing having a top plate and a downwardly extending wall that depends from and substantial portion of a perimeter of the top plate;
an attachment member configured to hingedly couple the housing to equipment such that the housing may rotate through a plurality of positions in relation to a surface below the housing, wherein the plurality of positions place the housing in a rotated position at an angle that is non-parallel to the surface below the housing;
first and second connection arms connecting respective first and second sides of the housing to first and second attachment points on the equipment, the attachment member and connection arms configured to hold the housing in a fixed position above the ground, wherein the first and second connection arms are configured to pivot the housing from side-to-side about an axis defined by the attachment member;
a discharge chute disposed in a front portion of the downwardly extending wall;
a first shaft mounted within the frame for rotation in a first direction;
a second shaft mounted within the frame for rotation in a second direction, which is opposite to the first direction, the second shaft being mounted in a substantially parallel plane with the first shaft;
first and second blades coupled to the first and second shafts;
a driving unit operatively connected to the first and second shafts for driving the first shaft in the first direction and the second shaft in the second direction;
a first roller extending along the rear surface of the housing, the roller configured to move ground cover rearward of the first and second shafts laterally inward within the housing; and
a flexible transmission coupled to the power source and configured to power the drive unit, wherein the transmission is operable at each of the plurality of positions of the housing.

12. The mower of claim 11, further comprising:
a first auger blade helically wrapped around a first portion of the roller;
a second auger blade helically wrapped around a second portion of the roller, wherein the second auger blade is disposed in a mirrored orientation to the first auger blade; and
a roller attachment feature for coupling the roller to the drive unit such that the power source rotates the roller.

13. The mower of claim 11, further comprising:
a shovel assembly including a bottom horizontal portion, a transition portion, and a downwardly extending portion coupled to the rear portion of the housing, the shovel assembly configured to direct ground cover on the ground towards the roller when the housing is disposed above the ground.

14. The mower of claim 13, further comprising:
a second roller suspended above the horizontal portion of the shovel assembly by a pair of arm supports.

15. The mower of claim 14, wherein the second roller is rotated by the drive unit.

* * * * *